A. M. JACOBS.
POSITION INDICATOR.
APPLICATION FILED SEPT. 12, 1919.
1,411,662.
Patented Apr. 4, 1922.
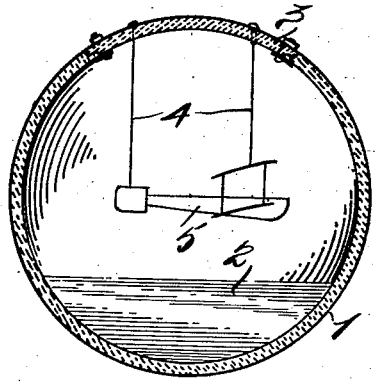
Fig. 1.
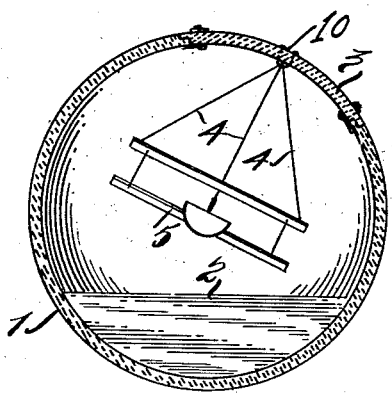
Fig. 2.
Fig. 3.
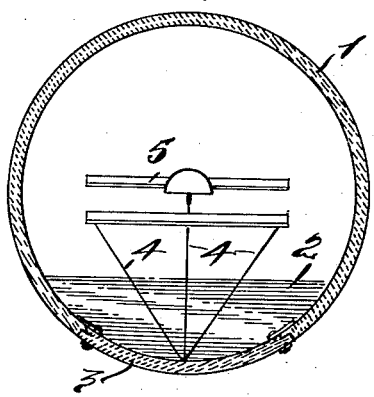
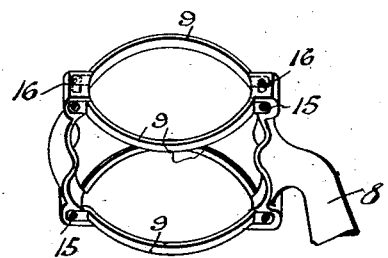
Fig. 6.
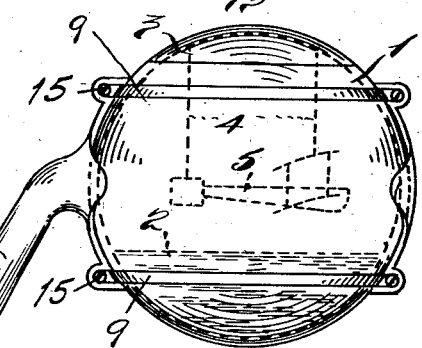
Fig. 4.
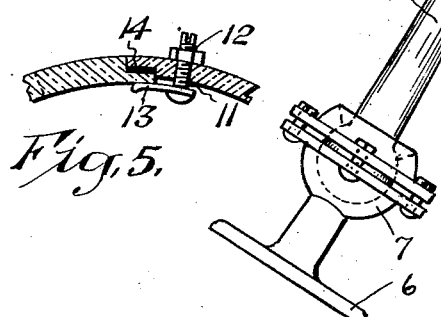
Fig. 5.
Inventor
Albert M. Jacobs.
By his Attorney
Emerson R. Newell

UNITED STATES PATENT OFFICE.

ALBERT M. JACOBS, OF EAST ORANGE, NEW JERSEY.

POSITION INDICATOR.

1,411,662.     Specification of Letters Patent.     Patented Apr. 4, 1922.

Application filed September 12, 1919. Serial No. 323,375.

*To all whom it may concern:*

Be it known that I, ALBERT M. JACOBS, a citizen of the Union of South Africa, residing at East Orange, New Jersey, have invented certain new and useful Improvements in Position Indicators, of which the following is a clear, full, and exact description.

My invention relates to a position indicator or clinometer which is particularly suitable for use in airships, submarines, tanks or the like, and an object of my invention is to provide a simple structure which will enable the observer to determine at a glance the inclination of the airship, submarine, tank or other conveyance with respect to the horizon.

An important feature of the invention is the provision of indicating means which is so mounted as to always maintain its axes parallel with the corresponding axes of the airship, submarine or other conveyance, whose inclination relative to the horizon is to be indicated, and providing further an artificial horizon in proximity to said indicator, the artificial horizon being maintained parallel to the real horizon so that inclination of the indicator relative to the said artificial horizon will be in exact proportion to the inclination of the conveyance with respect to the real horizon. Preferably in the practical embodiment of my invention, I provide a transparent sphere in which is a quantity of liquid, the surface of which forms an artificial horizon. I also provide an indicator that is so mounted that it is constrained to move with the sphere to any position such sphere may assume, the sphere being firmly connected to the airship, submarine, tank or other conveyance.

Other features and advantages will be apparent from the following specification and claims when taken in connection with the accompanying drawings in which—

Fig. 1 represents a sectional view through the sphere showing the indicator in side elevation;

Fig. 2 is a sectional view with the indicator in front elevation and showing the parts in the positions they would assume if the conveyance were moving with the left side higher than the right; or in the case of an aeroplane, with the left wing higher than the right wing;

Fig. 3 is a sectional view showing the parts in the position they would assume in case of an aeroplane flying upside down;

Fig. 4 is a view showing a conventional means of attaching the clinometer to a supporting structure.

Fig. 5 is a fragmentary sectional view on an enlarged scale showing a clamp for attaching the member 3 to the cylinder; and Fig. 6 is a fragmentary perspective of the rings supporting the cylinder.

Referring to the drawings, 1 represents a sphere made of suitable transparent material, such as glass or the like, and within the sphere is a suitable quantity of fluid 2 which is free to occupy any position with respect to the sphere, the surface of which liquid forming an artificial horizon. At 3, the sphere may be provided with a section which, if desired, may be of different material from that of the sphere and is made removable for the purpose of introducing the fluid within the sphere. This section may be secured in place by providing a U-shaped member 10, Fig. 2, riveted or otherwise fastened to the member 3, and to which member 10 the members 4 which support the indicator may be secured. In order to secure the section 3 in place, clamps such as are shown in Fig. 5 may be provided. These may consist of a screw-headed member 11, screw-threaded to receive a nut 12 and carrying rigidly secured to its lower end a projecting arm 13. When it is desired to introduce the liquid into the sphere, a tool is applied to the member 11 to turn the projecting arm 13 from beneath the inner surface of the sphere after first loosening the nut 12. After the liquid has been introduced, the arm 13 is turned to the position indicated in Fig. 5 and the nut 12 screwed down to securely clamp the sphere and the section 3 together, a gasket 14 being provided to make the joint tight. These members 4 may form with the indicator 5 a triangle, and said supporting members are sufficiently rigid so that the indicator is constrained to follow the sphere in all of its movements. The sphere is rigidly supported in any suitable and well-known manner in the cockpit or other suitable place in the airship, submarine or other conveyance on which the device is designed to be used. This support for the sphere comprises a base 6 screwed or otherwise fastened to the conveyance. At 7, a ball and socket adjustment is provided for an arm 8, to which arm the sphere 1 is attached by rings 9, as clearly shown in Figs. 4 and 6. These rings are, in effect, two part rings, each part being screwed into the support 8 at the points 15 and 16 after the sphere is adjusted. The indicator is so mounted within the sphere that its axes are parallel with the corresponding axes of the airship, submarine, or other conveyance, and these axes pass through the center of the sphere at right angles to each other. In order to render the position of the indicator more easily apparent, I preferably make it to represent a miniature of the conveyance on which it is used, and in the case of an airship, I may paint or otherwise mark the top side so as to distinguish it from the bottom side, because an airship may sometimes fly upside down.

With the sphere mounted as described, it will accurately follow all movements of the airship or conveyance on which it is mounted, and the indicator within the sphere being constrained to move therewith will also follow accurately all movements of the conveyance on which it is used. The liquid within the sphere, however, will be free to assume any position and, therefore, the inclination of the indicator with respect to the surface of the liquid, which surface represents an artificial horizon which is always substantially parallel with the true horizon, will indicate the inclination of the conveyance with respect to the true horizon. In other words, the position of the indicator, which is a miniature conveyance, with respect to the surface of the fluid within the sphere, approximately represents the position of the conveyance with respect to the horizon; approximately because of the inertia and viscosity of the fluid, there is a slight lag.

I have shown a conventional mounting for the sphere, consisting of a ball and socket joint so that an accurate adjustment of the sphere may be accomplished to place the axes of the indicator in parallelism with the axes of the conveyance.

While for the purpose of fully disclosing my invention I have shown one practical embodiment thereof, it is, of course, to be understood that I do not confine myself to the exact form of the device shown and described, but that variations may be resorted to within the scope of the invention as set forth in the claims.

What I claim as new is:

1. In an instrument for indicating the inclination relative to the horizon of an air ship, submarine or similar conveyance, the combination of a hollow transparent sphere, a liquid in said sphere to present an artificial horizon, an indicator made to represent a miniature of the conveyance and means connecting the indicator with the sphere whereby it is constrained to move therewith.

2. In an instrument for indicating the inclination relative to the horizon of an air ship or similar conveyance, the combination with a hollow transparent sphere, of an indicator in said sphere made to represent a miniature of the air ship or other conveyance and mounted to maintain its axes constantly parallel with the corresponding axes of the conveyance, and a liquid in said sphere presenting an artificial horizon.

3. In an instrument for indicating the inclination relative to the horizon of an air ship, submarine or similar conveyance, the combination of an indicator made to represent a miniature of such conveyance, a hollow sphere, means for connecting said indicator to said sphere so as to constrain it to move therewith, and a liquid contained in said sphere presenting an artificial horizon and cooperating with said indicator to show the inclination, in any plane, of the conveyance with respect to the horizon.

Signed at New York city, New York, this 4th day of September, 1919.

ALBERT M. JACOBS.